(12) United States Patent
Bernardini et al.

(10) Patent No.: US 11,182,195 B2
(45) Date of Patent: *Nov. 23, 2021

(54) DEPLOYING UPDATES TO VIRTUAL MACHINE IMAGES BASED ON DIFFERENCES IN ARTIFACTS

(71) Applicant: International Business Machines Corporation, Armonk, NY (US)

(72) Inventors: Gianluca Bernardini, Rome (IT); Antonio Di Cocco, Rome (IT); Claudio Marinelli, Latina (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/662,330

(22) Filed: Oct. 24, 2019

(65) Prior Publication Data

US 2020/0057670 A1 Feb. 20, 2020

Related U.S. Application Data

(63) Continuation of application No. 15/600,248, filed on May 19, 2017, now Pat. No. 10,534,628.

(51) Int. Cl.
*G06F 9/455* (2018.01)
*H04L 29/08* (2006.01)
*G06F 8/61* (2018.01)
*G06F 8/65* (2018.01)

(52) U.S. Cl.
CPC .......... *G06F 9/45558* (2013.01); *G06F 8/63* (2013.01); *G06F 8/65* (2013.01); *H04L 67/2847* (2013.01); *G06F 2009/45562* (2013.01)

(58) Field of Classification Search
CPC .......... G06F 9/45558; G06F 8/63; G06F 8/65; G06F 2009/45562; H04L 67/2847
See application file for complete search history.

(56) References Cited

U.S. PATENT DOCUMENTS

| | | | |
|---|---|---|---|
| 8,205,194 B2 | 6/2012 | Fries et al. | |
| 8,301,686 B1 * | 10/2012 | Appajodu | G06F 9/5077 709/201 |
| 8,364,639 B1 | 1/2013 | Koryakina et al. | |

(Continued)

OTHER PUBLICATIONS

IBM, "List of IBM Patents or Patent Applications Treated as Related," for U.S. Appl. No. 16/662,330, filed Oct. 24, 2019.

(Continued)

*Primary Examiner* — Benjamin C Wu
(74) *Attorney, Agent, or Firm* — Patterson + Sheridan, LLP (57) ABSTRACT

Embodiments include systems, methods, and computer program products to perform an operation for managing different virtual machine images as a single virtual machine image. The operation generally includes generating a representation of a virtual machine (VM) image, and generating a first VM instance from the VM image. The representation of the VM image includes a set of artifacts associated with the VM image. The operation also includes receiving an indication of an available software update. Upon determining that the software update is applicable to the representation of the VM image, the operation further includes applying the software update to the first VM instance image.

20 Claims, 7 Drawing Sheets

(56) References Cited

U.S. PATENT DOCUMENTS

| | | | |
|---|---|---|---|
| 8,572,587 B2 | 10/2013 | DeHaan et al. | |
| 9,280,374 B2 | 3/2016 | McNeill | |
| 9,286,102 B1 | 3/2016 | Harel et al. | |
| 9,298,443 B2 | 3/2016 | Assuncao et al. | |
| 9,641,406 B1* | 5/2017 | Allen | G06F 8/65 |
| 10,534,628 B2* | 1/2020 | Bernardini | G06F 9/45558 |
| 10,534,630 B2* | 1/2020 | Bernardini | G06F 9/45558 |
| 2011/0154320 A1* | 6/2011 | Verma | G06F 9/45558 718/1 |
| 2012/0131577 A1* | 5/2012 | Arcese | G06F 9/44521 718/1 |
| 2012/0246645 A1* | 9/2012 | Iikura | G06F 8/61 718/1 |
| 2012/0257820 A1 | 10/2012 | Sanghvi et al. | |
| 2012/0324446 A1 | 12/2012 | Fries et al. | |
| 2013/0031551 A1* | 1/2013 | Agarwal | G06F 9/06 718/1 |
| 2013/0047156 A1* | 2/2013 | Jian | G06F 9/5055 718/1 |
| 2013/0326503 A1* | 12/2013 | De | G06F 9/45558 718/1 |
| 2014/0137114 A1* | 5/2014 | Bolte | G06F 9/45558 718/1 |
| 2015/0067168 A1 | 3/2015 | Hegdal et al. | |
| 2015/0089494 A1 | 3/2015 | Beak et al. | |
| 2015/0301818 A1 | 10/2015 | Voronkov et al. | |
| 2016/0004549 A1 | 1/2016 | Emaru | |
| 2018/0241793 A1 | 8/2018 | Dellosa | |
| 2018/0336053 A1 | 11/2018 | Bernardini et al. | |
| 2018/0336055 A1 | 11/2018 | Bernardini et al. | |
| 2019/0140905 A1* | 5/2019 | Vembuli | G06F 9/5077 |

OTHER PUBLICATIONS

Ammons, G., et al., "Virtual machine images as structured data: the Mirage image library", HotCloud'11, Proceedings of the 3rd USENIX conference on Hot topics in cloud computing, 6 pages, USENIX Association, Berkeley, CA, USA © 2011.

Wartel, R. et al., "Image Distribution Mechanisms in Large Scale Cloud Providers", 2nd IEEE International Conference on Cloud Computing Technology and Science (CloudCom), Nov. 30-Dec. 3, 2010, pp. 112-117.

Zhou, W. et al., "Always Up-to-Date—Scalable Offline Patching of VM Images in a Compute Cloud", Proceedings of the 26th Annual Computer Security Applications Conference (ACSAC'10), Dec. 6-10, 2010, Austin, TX, USA, pp. 377-386.

Quigley, Paul, IBM developerWorks® Community Blog, "IBM Addresses Virtual Image Lifecycle Management; Adds Integration with Virtual Center (A View from the Cloud)", Aug. 2012, 3 pages.

VMware Workstation 5.0, © 2016 VMware, Inc., "Types of Clone: Full and Linked", <https://www.vmware.com/support/ws5/doc/ws_clone_typeofclone.html>.

* cited by examiner

DEPLOYING UPDATES TO VIRTUAL MACHINE IMAGES BASED ON DIFFERENCES IN ARTIFACTS

CROSS-REFERENCE TO RELATED APPLICATION

This application is a continuation of co-pending U.S. patent application Ser. No. 15/600,248, filed on May 19, 2017. The aforementioned related patent application is herein incorporated by reference in its entirety.

BACKGROUND

The present disclosure generally relates to cloud computing, and more specifically, to techniques for managing virtual machine (VM) images in different cloud computing environments as a single VM image.

Many large enterprises (e.g., companies, organizations, etc.) generally employ several cloud environments spread all over the world to support enterprise operations. In addition, enterprises can use each cloud environment for different purposes (e.g., in order to satisfy different requirements). For example, an enterprise can deploy different workloads across multiple Infrastructure-as-a-Service (IaaS) cloud computing environments, deploy a single workload that is load balanced across multiple IaaS cloud computing environments, deploy a single workload to one IaaS cloud computing environment and use other IaaS cloud computing environments as backup, etc.

In many cloud computing environments (e.g., IaaS cloud computing environments), an enterprise can provide its own virtual machine (VM) images for deployment into the cloud service provider's environment. When deployed, the virtual machine image runs on physical hardware in a multi-tenant environment, e.g., an environment of multiple physical host machines where each physical host may house one or more virtual machines. The cloud service provider determines the placement of each virtual machine. That is, the cloud service provider selects a host on which to launch the virtual machine image.

To limit image sprawling, enterprises generally use similar virtual machine images in each cloud computing environment. For example, an enterprise administrator can copy the same virtual machine image in each cloud computing environment and deploy instances from the copy of the virtual machine image. Such attempts, however, can still lead to image sprawling. For example, once instances (e.g., virtual machines) are deployed in each cloud computing environment from a single virtual machine image, the instances can quickly diverge in a short amount of time, e.g., as a result of users installing software, modifying the original configuration, etc.

As a result, administrators (and other IT personnel) are often faced with maintaining an ever increasing number of virtual machines and images in each cloud computing environment. For example, whenever the administrator has to apply a patch or other software update, the administrator generally verifies, for each instance, whether the patch is applicable for that instance. Doing so, however, for such a large number of instances among different cloud computing environments can be extremely complex and burdensome to administrators of an enterprise.

SUMMARY

One embodiment presented herein includes a method for managing different virtual machine images as a single virtual machine image. The method generally includes generating a representation of a virtual machine (VM) image, wherein the representation of the VM image comprises a set of artifacts associated with the VM image, and generating a first plurality of VM instance images from the VM image. The method also includes deploying a first plurality of instances on one or more computing devices from the first plurality of VM instance images, identifying one or more modifications made to the first plurality of VM instance images by the first plurality of instances, and receiving an indication of an available software update. Upon determining that the software update is applicable to the representation of the VM image, the method further includes determining, based on the one or more modifications and the software update, at least a subset of the first plurality of VM instance images for which the software update is applicable, and applying the software update to the subset of the first plurality of VM instance images.

Another embodiment presented herein includes a system. The system includes a processor and a memory storing one or more instructions which, when executed by the processor, performs an operation for managing different virtual machine images as a single virtual machine image. The operation includes generating a representation of a VM image, and generating a first VM instance from the VM image. The representation of the VM image includes a set of artifacts associated with the VM image. The operation also includes receiving an indication of an available software update. Upon determining that the software update is applicable to the representation of the VM image, the operation further includes applying the software update to the first VM instance image.

Another embodiment presented herein includes a computer program product that includes a storage medium having computer-readable program code executable by one or more computer processors to perform an operation for managing different virtual machine images as a single virtual machine image. The operation includes generating a representation of a VM image, and generating a first VM instance from the VM image. The representation of the VM image includes a set of artifacts associated with the VM image. The operation also includes receiving an indication of an available software update. Upon determining that the software update is applicable to the representation of the VM image, the operation further includes applying the software update to the first VM instance image.

DETAILED DESCRIPTION

Embodiments presented herein provide techniques for managing different virtual machine images among cloud computing environments as a single virtual machine image.

For example, a cloud management component on a server computing device can be configured to receive virtual machine images from users (e.g., administrators) for deployment to one or more cloud computing environments maintained by the cloud management component. Once received, the cloud management component can store the virtual machine images in an image repository, such that the virtual machine images are available to be deployed as instances (e.g., virtual machines) to any of the underlying cloud environments. That is, once the cloud management component receives a request from a user to deploy a virtual machine to a cloud environment, the cloud management component can retrieve the virtual machine image from the image repository, create an virtual machine instance image by cloning (or copying) the virtual machine image, and deploy (or launch) a virtual machine from the instance image.

The virtual machine image is generally used a template for creating a virtual machine. For example, the virtual machine image can include the operating system, data files, applications, virtual disk, etc., that the virtual machine uses when operating in the cloud environment. Each instance (e.g., virtual machine) created by the cloud management component can operate independently of other instances (and the base virtual machine image). As a result, while each virtual machine operates on its respective instance image, the virtual machine can make modifications to the instance image. That is, users can install new applications, modify applications, modify the original configuration of the instance image, remove applications, etc.

As noted, however, in situations where an administrator wishes to apply a software update, the administrator has to first verify, for each virtual machine, that the software update is applicable for that virtual machine, which can be very time-consuming. Moreover, while administrators can use conventional tools (e.g., such as installers, etc.) to automate the process of checking the status of instances, such tools generally have to be deployed for each instance. For example, assuming there are a thousand virtual machines operating in a cloud computing environment, a thousand instances of the installer would be deployed to such an environment. Continuing with this example, each instance of the installer would determine whether the software update (e.g., patch) was applicable for its virtual machine, and if so, apply the updated binary files associated with the software update to the virtual machine. However, when updating instances in this manner, the administrator can lose control of the decision of whether a particular software update is applicable or not for each instance. Thus, applying updates in this manner can increase the complexity of managing a cloud computing environment.

As such, embodiments presented herein provide techniques for reducing the complexity associated with managing different virtual machine images placed within multiple cloud computing environments. As described below, once the cloud management component receives a new virtual machine image (e.g., from a user, repository, etc.), the cloud management component can be configured to generate an abstract representation (referred to herein as a meta-representation) of the initial (base) virtual machine image, before deploying an instance from the base virtual machine image. The meta-representation of the initial virtual machine image generally includes a set of base artifacts, such as installed files, applications, image configuration, etc. Such set of artifacts can be predefined and uploaded to the cloud management component (e.g., by an administrator) along with the initial virtual machine image. In some embodiments, the cloud management component can receive the set of artifacts to use from a patch management component on a server computing device when generating the meta-representation of the virtual machine image.

Once the meta-representation is generated, the cloud management component can begin deploying instances to the cloud computing environments. For example, for each deployment request, the cloud management component can create a virtual machine instance image by copying the base virtual machine image, and deploy an instance (e.g., virtual machine) from the instance image. At the same time, the cloud management component can be configured to monitor the operation of the instances in the cloud computing environments. That is, the cloud management component can track modifications (e.g., changes to applications, installed files, image configuration, etc.) made to each instance image by the respective virtual machine. To do so, the cloud management component can capture a snapshot of each instance image while the virtual machine is running on the instance image, and analyze the snapshot to identify meta-data (e.g., files, directories, software repositories, operating system configurations, etc.) associated with the instance image. The cloud management component can compare the meta-data from the snapshot of the instance image to the meta-representation of the initial image to determine the set of changes made to the instance image by the virtual machine.

If the cloud management component receives an indication of a software update, the cloud management component can determine whether the software update is applicable to the base virtual machine image by checking if changes have to be made to the meta-representation of the base virtual machine image. If the update is applicable, the cloud management component applies the update to the meta-representation of the base virtual machine image. The cloud management component can determine the set of instance images the software update is applicable to based on the tracked modifications (from the snapshots) and the set of changes associated with the software update. The cloud management component can then apply the changes made to the meta-representation of the base virtual machine image to the determined set of instance images. Doing so allows the cloud management component to manage a single virtual machine image, as opposed multiple different instances (e.g., when applying a software update). Advantageously, the techniques presented herein provide a centralized management solution for updating different virtual machine images (e.g., located in multiple cloud computing environments), which can significantly simplify (e.g., compared to conventional techniques) the management of virtual machines by administrators of an enterprise cloud network.

Figure 1:
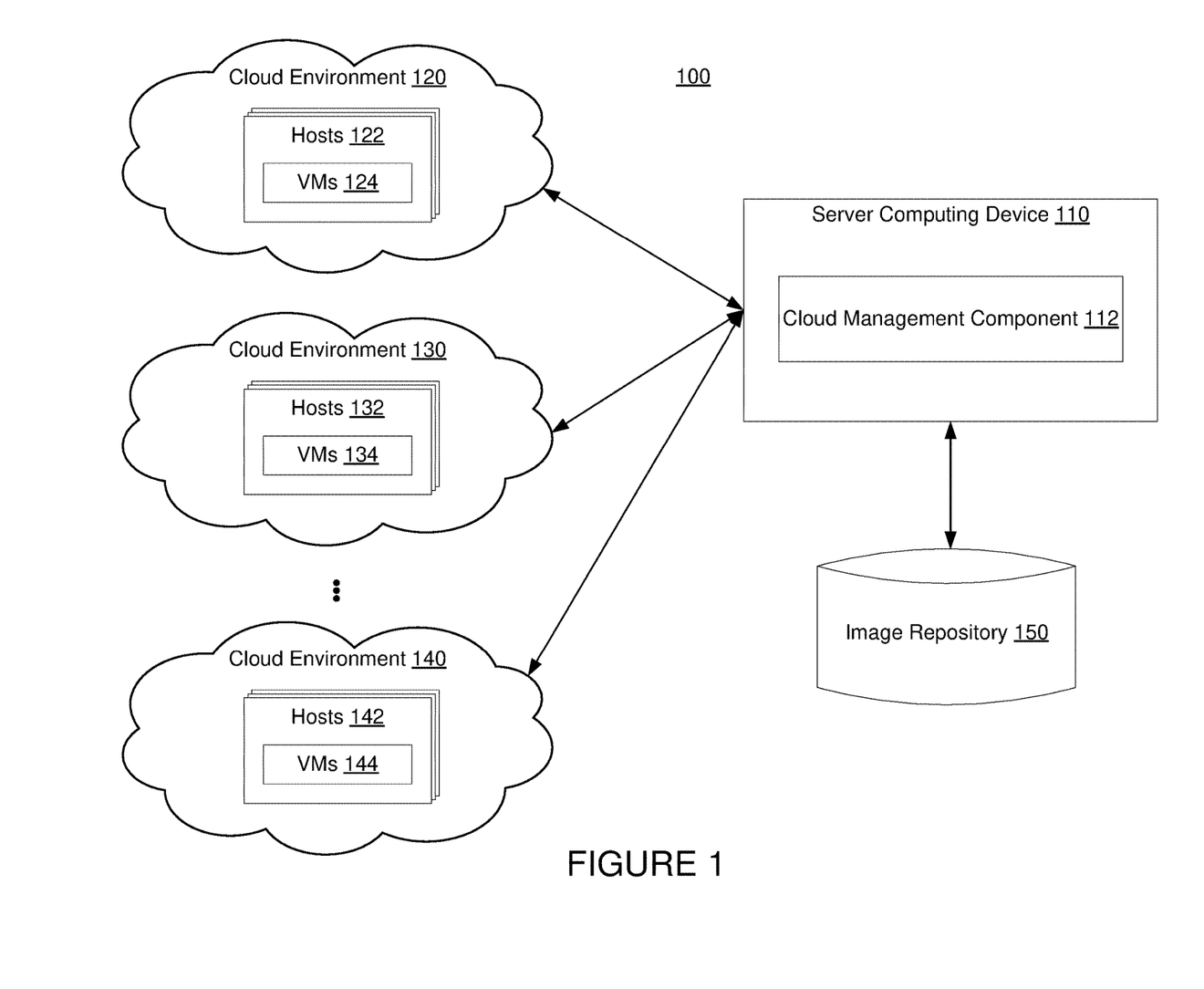
FIG. 1 illustrates an example cloud computing environment configured with a cloud management component, according to one embodiment.

FIG. 1 illustrates an example of a cloud computing environment 100 configured with a cloud management component, according to one embodiment. As shown, the cloud computing environment 100 includes server computing device 110, image repository 150 and cloud environments 120, 130, 140. In one embodiment, the cloud computing environment 100 is an example of a multi-cloud environment, with one or more sub-cloud environments 120-140. For example, the sub-cloud environments 120-140 can include IaaS cloud computing environments, Platform-as-a-Service (PaaS) cloud computing environments, Software-as-a-Service (SaaS) cloud computing environments, etc. In one particular embodiment, the cloud computing environment 100 and each of the sub-cloud environments 120-140 is an IaaS cloud computing environment. Although not shown, server computing device 110, image repository 150 and sub-cloud environments 120-140 may be connected via a network, which in general may be a telecommunications network, wide area network (WAN), Internet, etc.

Server computing device 110 is included to be representative of any kind of physical computing system, such as a desktop computer, laptop computer, server computing system, and the like. In one embodiment, server computing device 110 represents one or more servers hosted in the cloud environment with multiple computing systems. Server computing device 110 includes a cloud management component 112, which is generally configured to perform one or more of the techniques described herein. Cloud management component 112 may be accessed by a client (not shown) via a network. In one embodiment, cloud management component 112 is configured to drive and manage sub-cloud environments 120-140. That is, the cloud management component 112 can manage various physical nodes hosting virtual machine instances on behalf of a client in sub-cloud environments 120-140. For example, the cloud management component 112 can be used to deploy new virtual machine images on the hosts of sub-cloud environments 120-140, configure the network and storage connectivity within each sub-cloud environment 120-140, or perform a variety of other management tasks.

The cloud management component 112 is generally capable of deploying instances (e.g., virtual machines) on-demand. That is, clients can upload virtual machine images to the cloud management component 112 for deployment as virtual machines to one or more of the sub-cloud environments 120-140. Once received, the cloud management component 112 can store clients' virtual machine images in image repository 150 to make the images available to be deployed as virtual machines to the sub-cloud environments 120-140. For example, in one embodiment, upon receiving a request (e.g., from a client) to deploy a virtual machine, the cloud management component 112 can retrieve the client's virtual machine image from the image repository 150, and create a virtual machine instance image by copying the virtual machine image. Once copied, the cloud management component 112 can deploy a virtual machine to any of cloud environments 120-140 from the instance image. Each of the sub-cloud environments 120, 130, 140 includes one or more hosts 122, 132, 142, respectively. When deploying a virtual machine to a given sub-cloud environment 120, 130, 140, the cloud management component 112 can select which hosts 122, 132, 142 to place the virtual machine (e.g., VM 124, 134, 144).

The cloud management component 112 may determine the sub-cloud environment to deploy the virtual machine in based on the client's request (e.g., the request may specify which cloud environment to deploy an instance). In one embodiment, the cloud management component 112 can choose to deploy a virtual machine to one of sub-cloud environments 120-140 in order to satisfy a workload (e.g., as opposed to receiving an explicit request from a client to deploy an instance). Put differently, if the cloud management component 112 is responsible for running a particular job, the cloud management component 112 can automatically create a new instance image (e.g., from one of the virtual machine images stored in image repository 150) and deploy a virtual machine from the instance image to help run the job.

According to embodiments herein, once the cloud management component 112 receives a new virtual machine image (e.g., from a client), the cloud management component 112 can generate a meta-representation of the new (or base) virtual machine image (e.g., meta_image) and store the meta-representation of the base virtual machine image in image repository 150. The cloud management component 112 may do so before deploying instances from the virtual machine image to the sub-cloud environments 120-140. The meta-representation of the base virtual machine image can include artifacts, such as installed files, applications, image configuration, etc. In one embodiment, the client can specify when uploading the new virtual machine image the set of artifacts for the cloud management component 112 to use when generating the meta-representation of the virtual machine image. In one embodiment, the cloud management component 112 can receive the set of artifacts from another computing device (e.g., a patch management system).

Once the meta-representation of the base virtual machine image is generated, the cloud management component 112 can deploy virtual machines to cloud environments 120-140 based on copies (e.g., virtual machine instance images) of the base virtual machine image stored in the image repository 150. As the virtual machines start running on their respective instance images, the cloud management component 112 can monitor the operation of the virtual machines and track modifications to the instance images performed by the respective virtual machines.

For example, in one embodiment, the cloud management component 112 can periodically capture time-stamped snapshots of the state of each virtual machine. Such snapshots can aid the cloud management component 112 in determining whether the virtual machine instance images have been modified by the virtual machines (e.g., applications may have been installed, removed, or modified, the image configuration may have been modified, etc.). The cloud management component 112 can analyze each snapshot to identify meta-data including, but not limited to, files, directories, software repositories, operating system configurations, etc. The cloud management component 112 can compare the meta-data from the snapshots to the meta-representation of the base virtual machine image to determine if modifications have been made to the virtual machine instance images. For example, in one embodiment, the cloud management component 112 can generate a meta-representation of the snapshot to compare with the meta-representation of the base virtual machine image. The meta-representation of the snapshot (of the instance image) can include a subset of the artifacts captured from the snapshot. In one embodiment, the cloud management component 112 can receive the subset of artifacts to use when generating the meta-representation of the snapshot from another computing device (e.g., a patch management system). Once the cloud management component 112 determines the set of modifications made to each virtual machine instance image, the cloud management component 112 can store the modifications associated with the virtual machine in a storage system (e.g., such as image repository 150, or another database in the cloud computing environment 100). In addition, such modifications can be stored with a time-stamp indicating when the snapshot was captured by the cloud management component 112.

As part of managing sub-cloud environments 120-140, the cloud management component 112 can receive available software updates that may apply to the virtual machines in the sub-cloud environments. Such software updates, for example, can include security patches, updated configurations, application changes, and so on. In one embodiment, upon receiving data (e.g., patch data, or other software update data) describing changes that may be available for the virtual machine instances, the cloud management component 112 can verify whether the changes are applicable to the instance images by determining if changes (as a result of the software update) have to be made to the meta-representation of the base virtual machine image. If the update is applicable, the cloud management component 112 can apply the software update to the base virtual machine image by updating the meta-representation of the base virtual machine image. For example, in one embodiment, the cloud management component 112 can apply the relevant updated binary files (associated with the software update) to the meta-representation of the base virtual machine image.

At the same time, the cloud management component 112 can directly update the virtual machine instances (that the software update applies to) with the relevant updated binary files associated with the update. For example, in one embodiment, the cloud management component 112 can mount the virtual disk (e.g., .vhd, .vdi, .vdmk, etc.) for each virtual machine, locate the file(s) associated with the instance image of the virtual machine, and update the file(s) with the update binary files of the software update. As such, the cloud management component 112 allows an administrator to retain control of the decision of whether a software update is applicable to the different instance images in the sub-cloud environments 120-140.

In addition, in some embodiments, the cloud management component 112 can build packages for each instance image that include the relevant portion of the binary files associated with the software update. For example, the cloud management component 112 may determine, based on the set of modifications for an instance image, that some of the updated binary files are not applicable for that instance image. That is, in some cases, the updated binary files may have already been applied to the instance image, the component of the instance image that will be modified by the updated binary files may not be present in the instance image, etc. In these situations, the cloud management component 112 can determine which portions of the binary files are relevant for each instance image and apply the relevant portions to the instance image.

Advantageously, the cloud management component 112 allows an administrator to maintain a single virtual machine image rather than multiple instances of the virtual machine image. That is, for example, the cloud management component 112 can modify instances by applying changes (associated with a software update) to the meta-representation of the virtual machine image, as opposed to each individual instance. As such, the cloud management component 112 can significantly simplify image management for cloud computing environments.

Figure 2A:
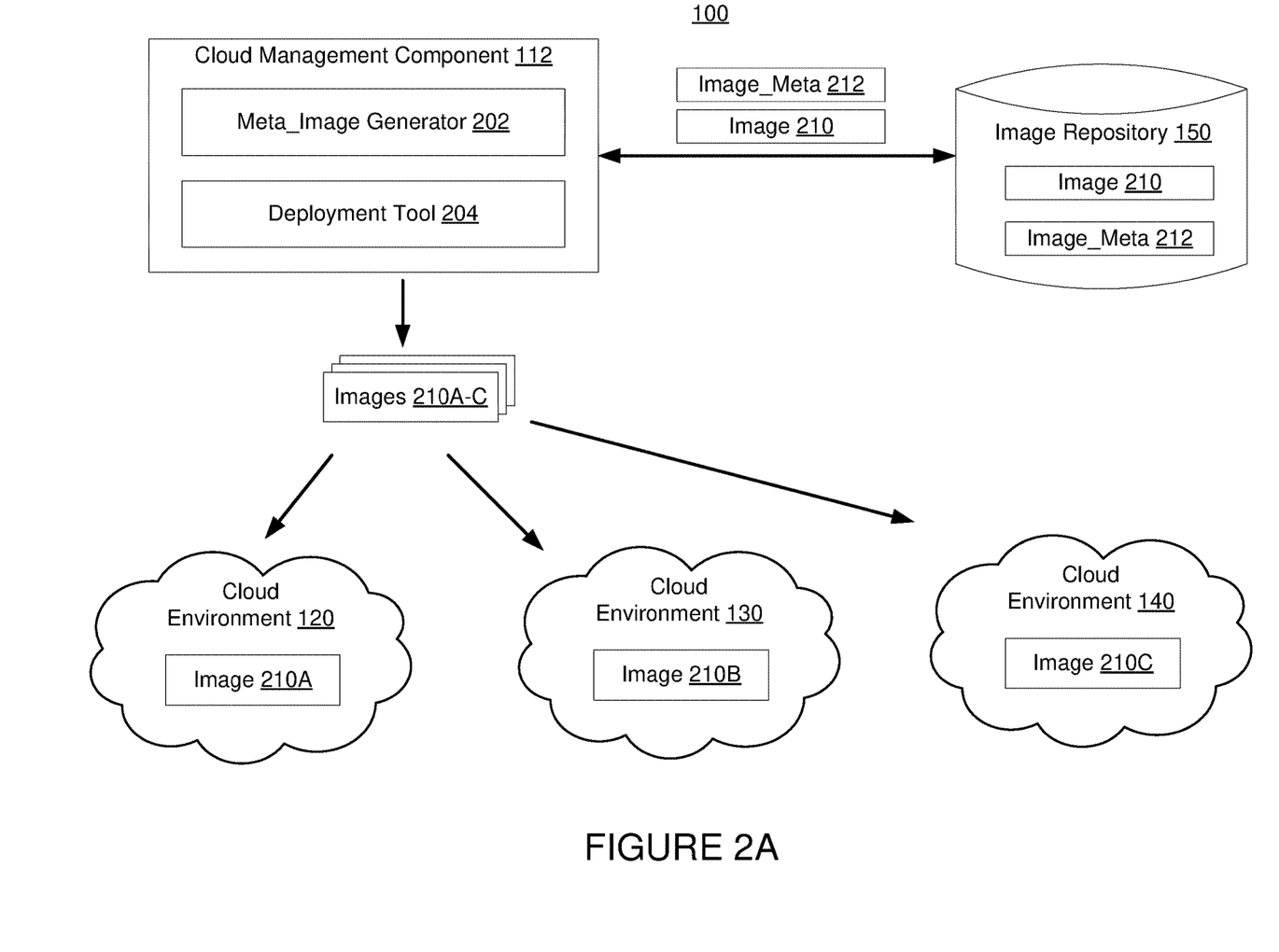
FIGS. 2A-2B illustrate an example scenario of a cloud management component managing different virtual machine images as a single virtual machine image, according to one embodiment.
Figure 2B:
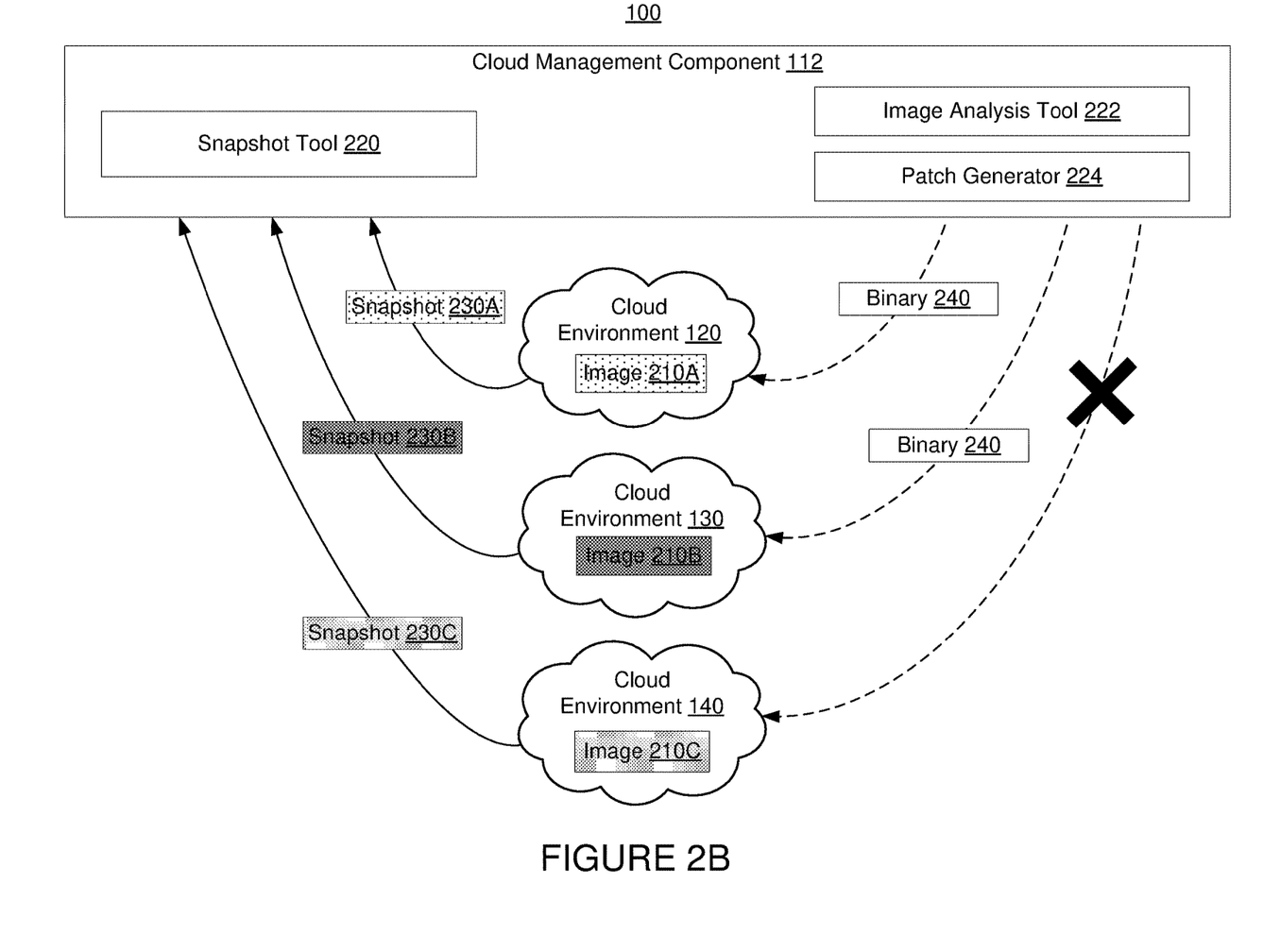

FIGS. 2A-2B illustrate an example scenario of the cloud management component 112 managing different virtual machine images as a single virtual machine image, according to one embodiment. The cloud management component 112 includes a meta_image generator 202 and a deployment tool 204 (e.g., as shown in FIG. 2A), and snapshot tool 220, image analysis tool 222, and patch generator 224 (e.g., as shown in FIG. 2B). Referring first to FIG. 2A, once the cloud management component 112 receives a new virtual machine image 210 (e.g., from a client), the cloud management component 112 can use meta_image generator 202 to generate a meta-representation of the image 210 (e.g., image_meta 212). The cloud management component 112 can store the received image 210 and generated image_meta 212 in image repository 150.

Once generated, the cloud management component 112 can use deployment tool 204 to deploy instances (e.g., virtual machines) to the sub-cloud environments 120-140. In one embodiment, the cloud management component 112 can do so upon request from a client. For example, a client may request that x number of instances be deployed to cloud environment 120 from image 210, y number of instances be deployed to cloud environment 130 from image 210, z number of instances be deployed to cloud environment 140 from image 210. In one embodiment, instead of deploying instances in response to a client request, the cloud management component 112 may deploy instances on its own in order to help satisfy a job (or workload).

The deployment tool 204 may deploy an instance by retrieving (e.g., importing) image 210 from the image repository 150, copying the image 210 to generate an instance image, and launching the instance image as a virtual machine (e.g., in one of the sub-cloud environments 120-140). In this particular embodiment, the deployment tool 204 creates three instance images 210A-C, and deploys one of the instance images 210A-C to each sub-cloud environment 120-140 as a virtual machine (e.g., instance image 210A to sub-cloud environment 120, instance image 210B to sub-cloud environment 130, and instance image 210C to sub-cloud environment 140). Once deployed, each virtual machine can run independently, and therefore, can make modifications to the instance image the virtual machine is operating on. For example, new applications can be installed (or modified), the image configuration can be changed, etc. In these cases, as the virtual machines run, the instance images 210A-C can quickly begin to diverge from the base image 210 (e.g., as indicated by the shading and grayscale of images 210A-C in FIG. 2B).

In one embodiment, the cloud management component 112 can be configured to monitor the operation of the virtual machines in each sub-cloud environment, and track modifications made to instance images 210A-C by the virtual machines. For example, the cloud management component 112 can use snapshot tool 220 to capture snapshots (at different points in time) of the instance images 210A-C, while the virtual machines operate on the instance images 210A-C. In the depicted embodiment, the snapshot tool 220 captures a snapshot 230A of instance image 210A, a snapshot 230B of instance image 210B, and a snapshot 230C of instance image 210C. As noted, each snapshot 230A-230C includes a set of artifacts associated with the state of the instance images 210A-210C at the time the snapshot is captured. The cloud management component 112 can use image analysis tool 222 to compare the artifacts associated with the snapshots 230A-230C to image_meta 212 in order to determine the set of changes (or modifications) made to each of the instance images 210A-210C. The cloud management component 112 can store the modifications associated with each instance image 210A-C in a database within the cloud computing environment 100.

Once the cloud management component 112 receives a patch (e.g., software update), the cloud management component 112 can use patch generator 224 to determine if the patch is applicable to the base virtual machine image 210 (e.g., by evaluating the patch and the image_meta 212). Put differently, the patch generator 224 can determine whether the set of changes associated with the patch are applicable to artifacts in image_meta 212. If the patch is applicable, the patch generator 224 can apply the relevant updated binary files of the patch to the image_meta 212 in order to update the meta-representation of the base virtual machine image and generate a modified meta-representation of the base virtual machine image.

In addition, the patch generator 224 can apply the same updated binary files to the set of relevant instance images. The patch generator 224 can determine the set of relevant instance images (to apply the binaries to) based on the tracked modifications from the snapshots 230A-C and the list of changes associated with the patch. For example, assume that the patch includes an update to component A associated with image_meta 212. In this example, if the patch generator 224 determines from the snapshots of the instance images 210A-C that instance images 210A-B have component A but instance image 210C does not have component A (e.g., due to modification), the patch generator 224 may not apply the binary files to instance image 210C. Thus, in an illustration of this example shown in FIG. 2B, the patch generator can apply binary files 240 to both instance images 210A and 210B, but not instance image 210C.

As noted above, when applying the binary files 240 of the patch, the patch generator 224 can mount the virtual disk of each virtual machine for instance image 210A and 210B, locate the file(s) associated with the instance images 210A and 210B, and update the file(s) with the binary files 240. Note that for the sake of clarity, the embodiment depicted in FIGS. 2A-2B use three instances of the virtual machine image in the sub-cloud environments (e.g., one instance in each sub-cloud environment) as a reference example of how the cloud management component can manage different virtual machine images among cloud environments as a single image. Those of ordinary skill in the art will recognize that within each sub-cloud environment there can be any number of virtual machines deployed by the cloud management component, as well as any number of sub-cloud environments maintained by the cloud management component.

Figure 3:
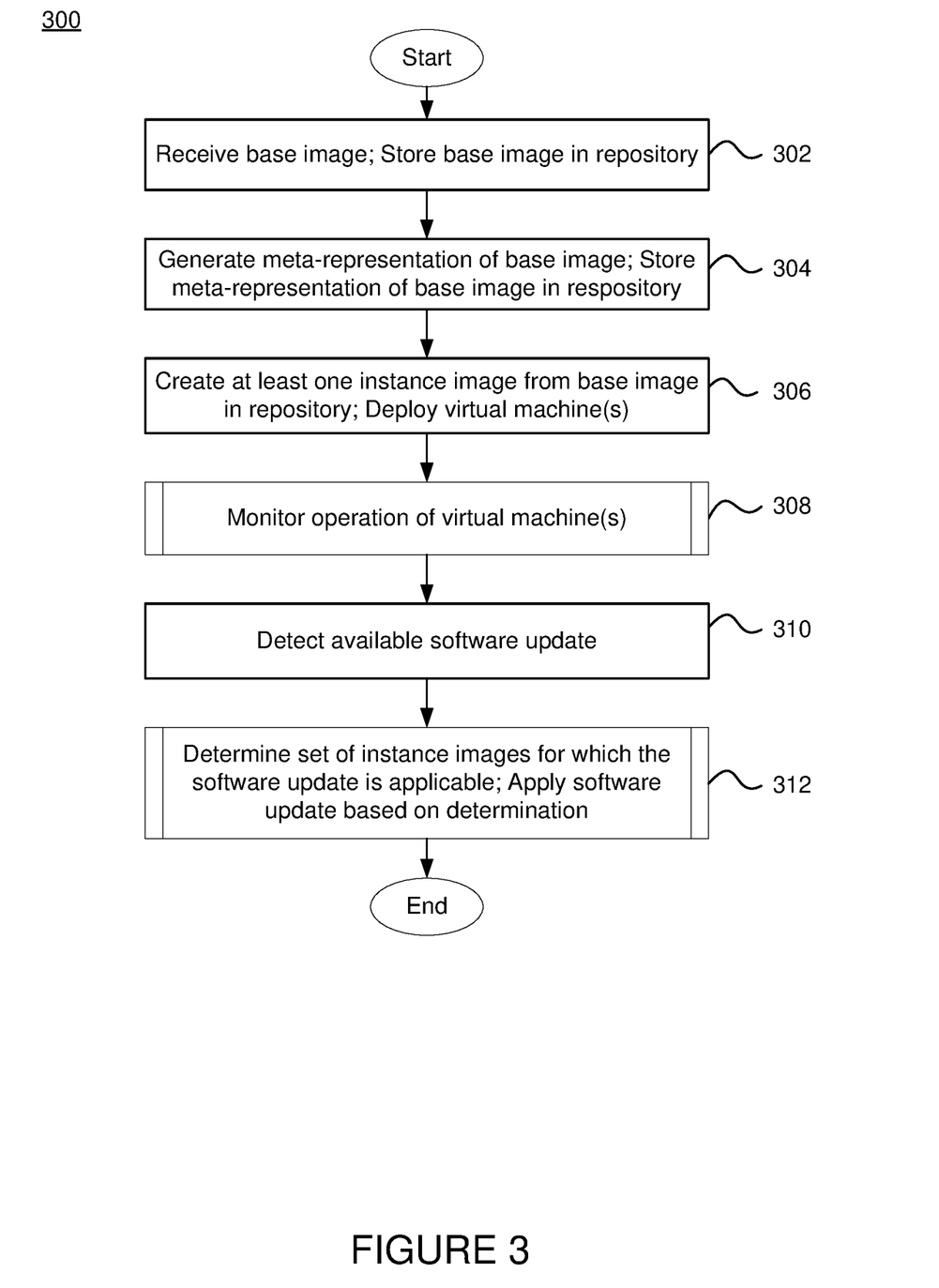
FIG. 3 is a flow chart illustrating a method for managing different virtual machine images as a single virtual machine image.

FIG. 3 is a flow chart illustrating a method 300 for managing different virtual machine images as a single virtual machine image, according to one embodiment. As shown, the method begins at block 302 where the cloud management component 112 receives an initial (or base) virtual machine image for deployment in a cloud computing environment (e.g., one of sub-cloud environments 120-140). The cloud management component 112 stores the base virtual machine image in a repository (e.g., image repository 150). At block 304, the cloud management component 112 generates a meta-representation of the base virtual machine image, and stores the meta-representation of the base virtual machine image in the repository.

At block 306, the cloud management component 112 creates at least one instance image from the base virtual machine image (e.g., by copying the base virtual machine image). The cloud management component 112 then deploys at least one virtual machine from the at least one instance image. At block 308 (which is described in greater detail in FIG. 4), the cloud management component 112 monitors the operation of the virtual machine(s) (e.g., deployed instance(s)) in order to track modifications made to the instance image(s) by the virtual machine(s). At block 310, the cloud management component 112 detects an available software update. Such software update, for example, can be received from an administrator, patch management system in the cloud computing environment (e.g., environment 100), etc. At block 312 (which is described in greater detail in FIG. 5), the cloud management component 112 determines the set of instance images for which the software update is applicable. After the cloud management component 112 applies the software update based on the determination, the method 300 ends.

Figure 4:
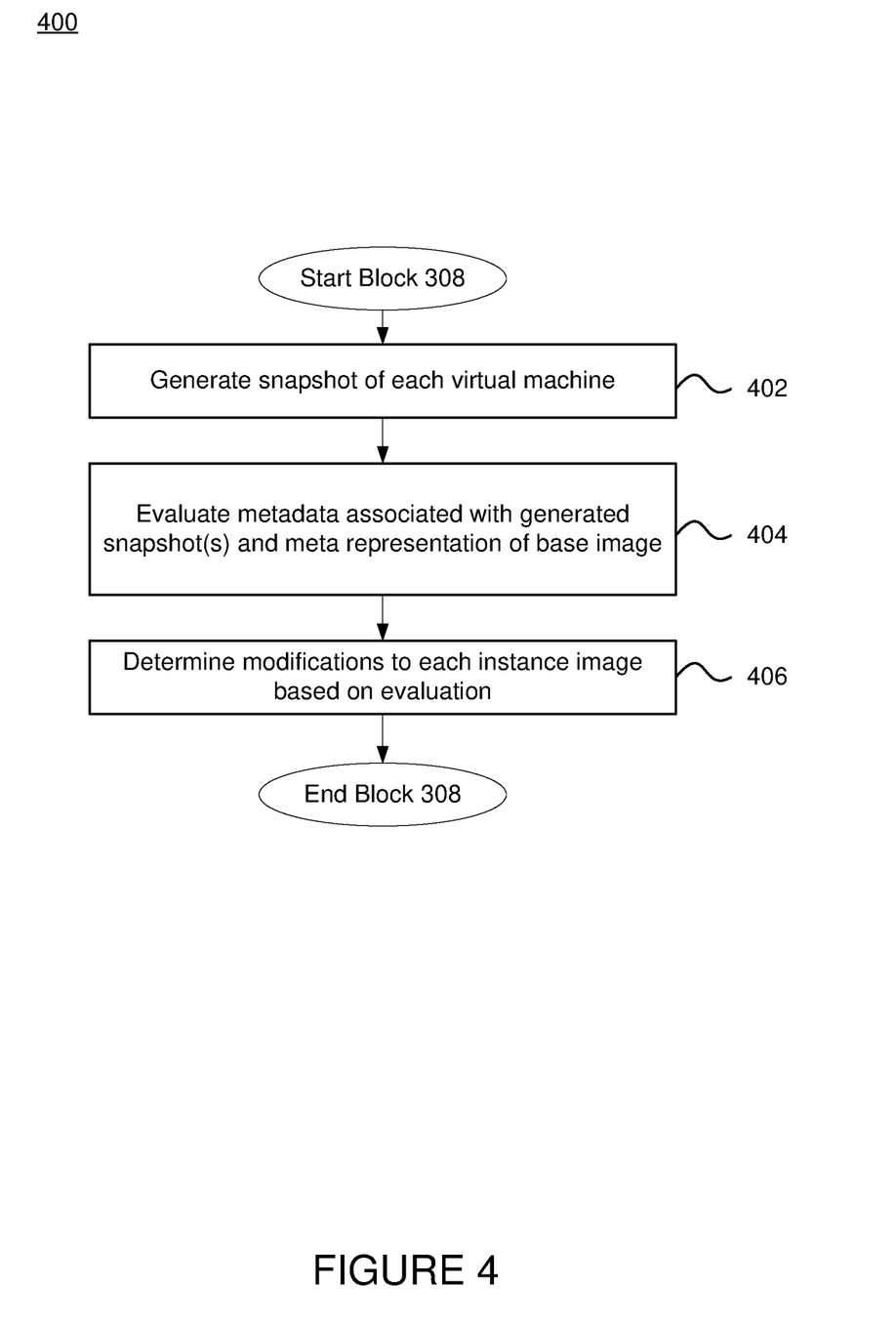
FIG. 4 is a flow chart illustrating a method for monitoring deployed instances (e.g., virtual machines), according to one embodiment.

FIG. 4 is a flow chart illustrating a method 400 for monitoring deployed instances (e.g., virtual machines), according to one embodiment. The method 400 begins at block 308 of FIG. 3 when the cloud management component 112 monitors operation of the virtual machines. At block 402, the cloud management component 112 generates (or captures) a snapshot of the state of each virtual machine. At block 404, the cloud management component 112 evaluates metadata associated with the (snapshots of the) instance images of the virtual machines along with the meta-representation of the base virtual machine image. At block 406, the cloud management component 112 determines a set of modifications to each instance image (e.g., made by the respective virtual machine), based on the evaluation. That is, as noted above, the cloud management component 112 can compare the set of artifacts associated with the meta-representation of the base virtual machine image to the set of artifacts captured in the snapshot of the instance image for each virtual machine to identify the set of modifications. In one embodiment, the cloud management component 112 can store the set of modifications for each instance image (along with a timestamp indicating when the snapshot was taken and other identification information) in a database hosted in the cloud computing environment.

Figure 5:
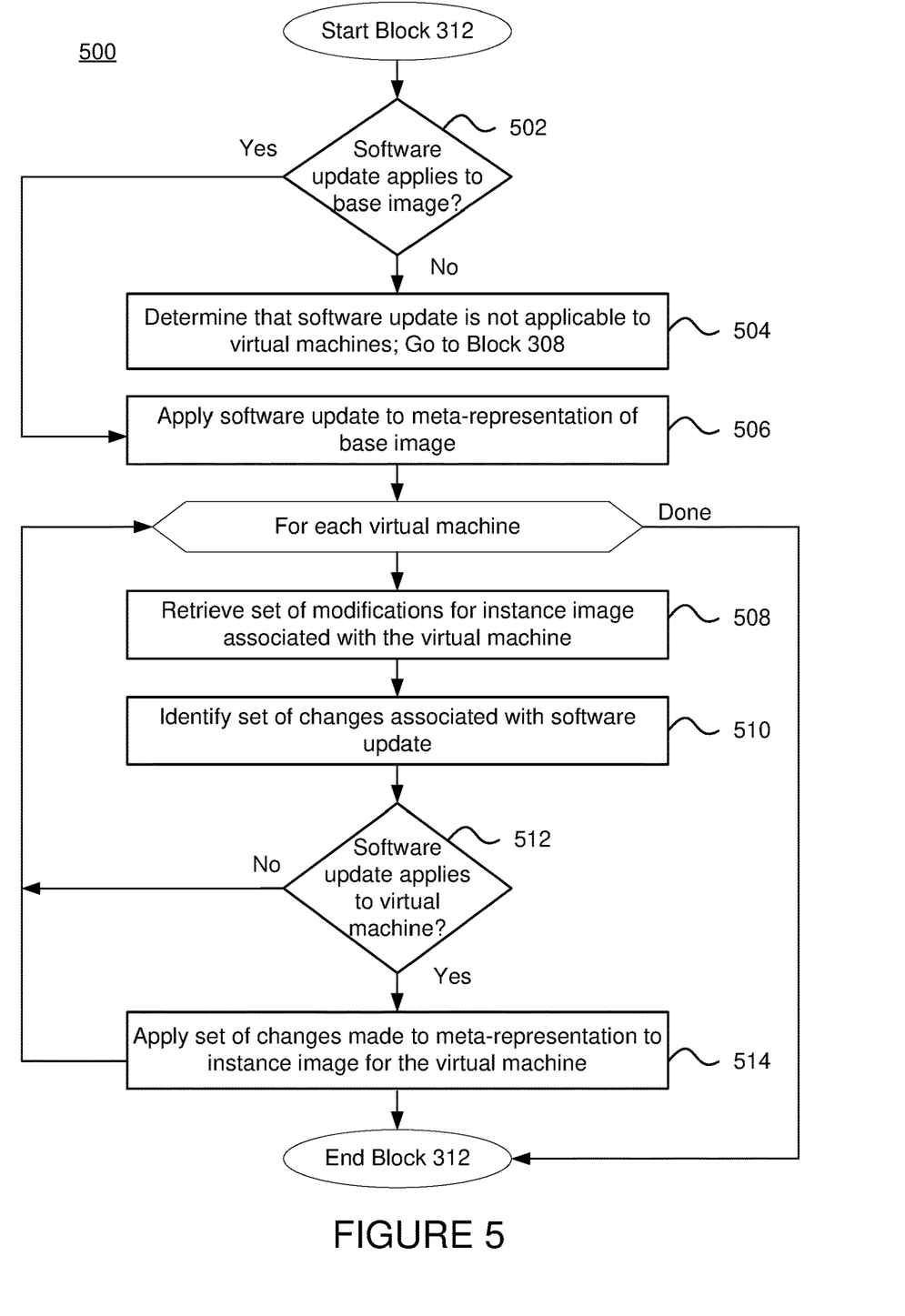
FIG. 5 is a flow chart illustrating a method for determining a set of virtual machine instance images for which a software update is applicable, according to one embodiment.

FIG. 5 is a flow chart illustrating a method 500 for determining a set of virtual machine instance images for which the software update is applicable, according to one embodiment. The method 500 begins at block 312 of FIG. 3. At block 502, the cloud management component 112 determines whether the software update applies to the base virtual machine image. As noted above, the cloud management component 112 can do so based on determining if the changes associated with the software update are relevant to the artifacts associated with the meta-representation of the base virtual machine image. If the update is inapplicable, at block 504, the cloud management component 112 determines that the software update is not applicable to the virtual machines, and proceeds to continue monitoring the operation of the virtual machines (e.g., block 308 of FIG. 3). That is, the cloud management component 112 may forego applying the software update to the virtual machine instance images.

On the other hand, if the cloud management component 112 determines the software update is applicable to the base virtual machine image, the cloud management component 112, at block 506, applies the relevant set of changes associated with the software update to the meta-representation of the base virtual machine image (e.g., in order to update the meta-representation). As noted above, the updating may include applying the relevant set of binary files associated with the software update (e.g., patch) to the artifacts associated with the meta-representation.

For each virtual machine, the cloud management component 112 retrieves the set of modifications associated with the instance image for the virtual machine (e.g., from the database) (block 508), identifies the set of changes associated with the software update (block 510), and determines, based on the set of modifications and the set of changes associated with the software update, whether the set of changes are applicable for the instance image for the virtual machine (block 512). If the update is applicable, the cloud management component 112 applies the set of changes that were made to the meta-representation to the instance image for that virtual machine (block 514). After the cloud management component 112 performs blocks 508-514 for each virtual machine, the method 500 ends.

Advantageously, the cloud management component 112 is able to retain control of which instance images get updated, e.g., as opposed to using multiple instances of an installer to apply the patches to the virtual machines. Further, the cloud management component 112 can be used to simplify the management of the instances in each cloud environment, as the cloud management component 112 can update instances based on updating the meta-representation of the base virtual machine image, as opposed to considering each individual virtual machine.

Figure 6:
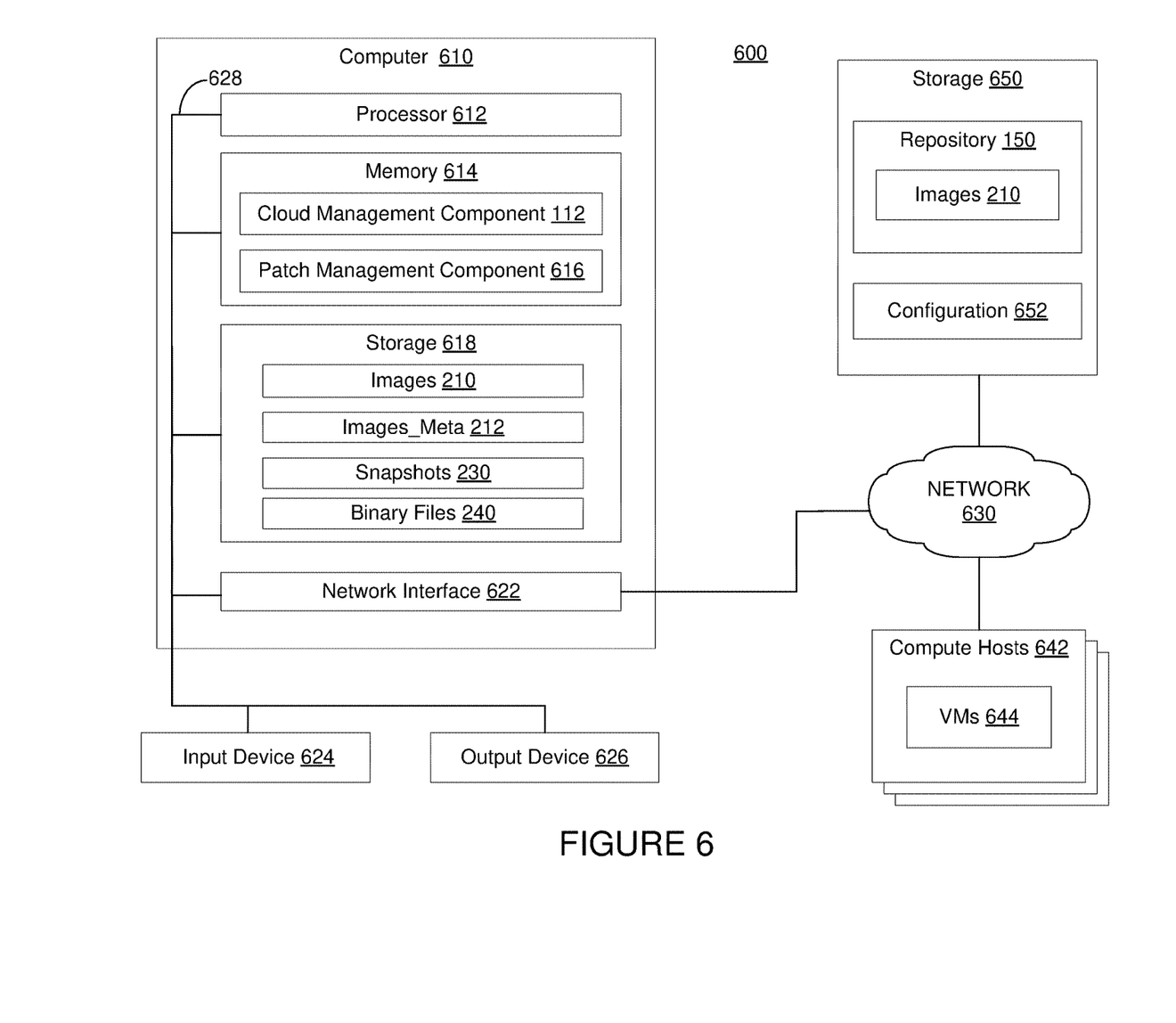
FIG. 6 is a block diagram illustrating a computing system configured to manage different virtual machine images as a single image, according to one embodiment.

FIG. 6 illustrates an example system 600 configured to manage different virtual machine images as a single virtual machine image, according to one embodiment. In one embodiment, the networked system 600 represents a multi-cloud computing environment (e.g., multiple IaaS cloud computing environments). The networked system 600 includes a computer 610. The computer 610 may also be connected to other computers via a network 630. In general, the network 630 may be a telecommunications network and/or a wide area network (WAN). In a particular embodiment, the network 630 is the Internet. The computing elements shown in system 600 may correspond to a physical computing system (e.g., a system in a data center) or may be a virtual computing instance executing within a computing cloud.

The computer 610 generally includes a processor 612 which obtains instructions and data via a bus 628 from a memory 614 and/or a storage 618. The computer 610 may also include one or more network interface devices 622, input devices 624, and output devices 626 connected to the bus 628. The computer 610 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 612 is a programmable logic device that performs instruction, logic, and mathematical processing, and may be representative of one or more CPUs. The network interface device 622 may be any type of network communications device allowing the computer 610 to communicate with other computers via the network 630.

The storage 618 is representative of hard-disk drives, solid state drives, flash memory devices, optical media and the like. Generally, the storage 618 stores application programs and data for use by the computer 610. In addition, the memory 614 and the storage 618 may be considered to include memory physically located elsewhere; for example, on another computer coupled to the computer 610 via the bus 628, storage 650, etc. As shown, storage 618 includes virtual machine images 210, generated meta-representations 212 of the images 210, snapshots 230 and binary files 240, all of which are discussed in greater detail above. Further, storage 650 includes an image repository 150, which stores virtual machine images 210, and image configuration information 652.

The input device 624 may be any device for providing input to the computer 610. For example, a keyboard and/or a mouse may be used. The input device 624 represents a wide variety of input devices, including keyboards, mice, controllers, and so on. Furthermore, the input device 624 may include a set of buttons, switches or other physical device mechanisms for controlling the computer 610. The output device 626 may include output devices such as monitors, touch screen displays, and so on.

As shown, the memory 614 includes cloud management component 112, which can include meta_image generator 202, deployment tool 204, snapshot tool 220, image analysis tool 222, and patch generator 224, all of which are discussed in greater detail above. For example, as noted above, the cloud management component 112 can be configured to deploy instances of the images 210 as the virtual machines 644 on the compute hosts 642, which can be located in different sub-cloud environments. Further, memory 614 includes patch management component 616, which is generally configured to send patch data (or other software updates) to the cloud management component 112, which, in turn, may choose to apply to different virtual machines 644 placed on one or more compute hosts 642 in one or more cloud computing environments.

Advantageously, embodiments disclosed herein provide techniques that can manage and update different virtual machine instance images from a single virtual machine image. Doing so simplifies image management for cloud computing environments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., cloud management component 112) or related data available in the cloud. For example, the cloud management component 112 could execute on a computing system in the cloud, and receive one or more virtual machine images from a user fro deployment as virtual machines to one or more sub-cloud environments. In such a case, the cloud management component 112 could manage the different instance images for the virtual machines as a single virtual machine image and store the single virtual machine image at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
    identifying an instance deployed on a computing device from a virtual machine (VM) instance image, wherein the VM instance image is generated from a base VM image;
    generating a representation of the base VM image based on a first set of artifacts from the base VM image, wherein the representation of the base VM image comprises a subset of the first set of artifacts;
    determining one or more modifications made to the VM instance image via the deployed instance, comprising:
        generating a snapshot of the VM instance image; and
        comparing a second set of artifacts associated with the snapshot of the VM instance image with the subset of the first set of artifacts in the representation of the base VM image to determine the one or more modifications; and
    applying a software update to the VM instance image, based in part on the determined one or more modifications.

2. The method of claim 1, further comprising determining the software update is applicable to the VM instance image based in part on determining that the software update is applicable to the representation of the base VM image.

3. The method of claim 2, wherein determining that the software update is applicable to the representation of the base VM image comprises determining that at least one change associated with the software update applies to at least one of the subset of the first set of artifacts in the representation of the base VM image.

4. The method of claim 1, wherein applying the software update comprises:
    identifying a plurality of changes associated with the software update that are applicable to the representation of the base VM image; and
    determining a subset of the plurality of changes that are applicable to the VM instance image, based on the determined one or more modifications.

5. The method of claim 4, wherein applying the software update further comprises:
    applying the subset of the plurality of changes to the representation of the base VM image to generate a modified representation of the base VM image; and
    modifying the VM instance image based on the modified representation of the base VM image.

6. The method of claim 1, wherein the second set of artifacts associated with the snapshot of the VM instance image and the subset of the first set of artifacts in the representation of the base VM image each comprise metadata associated with at least one of: installed files, installed applications, and configuration information.

7. The method of claim 1, wherein the VM instance image is one of a plurality of VM instance images generated from the base VM image and located in one of a plurality of cloud computing environments.

8. A system, comprising:
    a processor; and
    a memory storing one or more instructions which, when executed by the processor, performs an operation comprising:
    identifying an instance deployed on a computing device from a virtual machine (VM) instance image, wherein the VM instance image is generated from a base VM image;
    generating a representation of the base VM image based on a first set of artifacts from the base VM image, wherein the representation of the base VM image comprises a subset of the first set of artifacts;
    determining one or more modifications made to the VM instance image via the deployed instance, comprising:
        generating a snapshot of the VM instance image; and
        comparing a second set of artifacts associated with the snapshot of the VM instance image with the subset of the first set of artifacts in the representation of the base VM image to determine the one or more modifications; and
    applying a software update to the VM instance image, based in part on the determined one or more modifications.

9. The system of claim 8, the operation further comprising determining the software update is applicable to the VM instance image based in part on determining that the software update is applicable to the representation of the base VM image.

10. The system of claim 9, wherein determining that the software update is applicable to the representation of the base VM image comprises determining that at least one change associated with the software update applies to at least one of the subset of the first set of artifacts in the representation of the base VM image.

11. The system of claim 8, wherein applying the software update comprises:
    identifying a plurality of changes associated with the software update that are applicable to the representation of the base VM image; and
    determining a subset of the plurality of changes that are applicable to the VM instance image, based on the determined one or more modifications.

12. The system of claim 11, wherein applying the software update further comprises:
   applying the subset of the plurality of changes to the representation of the base VM image to generate a modified representation of the base VM image; and
   modifying the VM instance image based on the modified representation of the base VM image.

13. The system of claim 8, wherein the second set of artifacts associated with the snapshot of the VM instance image and the subset of the first set of artifacts in the representation of the base VM image each comprise metadata associated with at least one of: installed files, installed applications, and configuration information.

14. The system of claim 8, wherein the VM instance image is one of a plurality of VM instance images generated from the base VM image and located in one of a plurality of cloud computing environments.

15. A computer-readable storage medium having computer-readable program code stored thereon, the computer-readable program code executable by one or more computer processors to perform an operation comprising:
   identifying an instance deployed on a computing device from a virtual machine (VM) instance image, wherein the VM instance image is generated from a base VM image;
   generating a representation of the base VM image based on a first set of artifacts from the base VM image, wherein the representation of the base VM image comprises a subset of the first set of artifacts;
   determining one or more modifications made to the VM instance image via the deployed instance, comprising:
      generating a snapshot of the VM instance image; and
      comparing a second set of artifacts associated with the snapshot of the VM instance image with the subset of the first set of artifacts in the representation of the base VM image to determine the one or more modifications; and
   applying a software update to the VM instance image, based in part on the determined one or more modifications.

16. The computer-readable storage medium of claim 15, the operation further comprising determining the software update is applicable to the VM instance image based in part on determining that the software update is applicable to the representation of the base VM image.

17. The computer-readable storage medium of claim 16, wherein determining that the software update is applicable to the representation of the base VM image comprises determining that at least one change associated with the software update applies to at least one of the subset of the first set of artifacts in the representation of the base VM image.

18. The computer-readable storage medium of claim 15, wherein applying the software update comprises:
   identifying a plurality of changes associated with the software update that are applicable to the representation of the base VM image; and
   determining a subset of the plurality of changes that are applicable to the VM instance image, based on the determined one or more modifications.

19. The computer-readable storage medium of claim 18, wherein applying the software update further comprises:
   applying the subset of the plurality of changes to the representation of the base VM image to generate a modified representation of the base VM image; and
   modifying the VM instance image based on the modified representation of the base VM image.

20. The computer-readable storage medium of claim 15, wherein the second set of artifacts associated with the snapshot of the VM instance image and the subset of the first set of artifacts in the representation of the base VM image each comprise metadata associated with at least one of: installed files, installed applications, and configuration information.

* * * * *